UNITED STATES PATENT OFFICE.

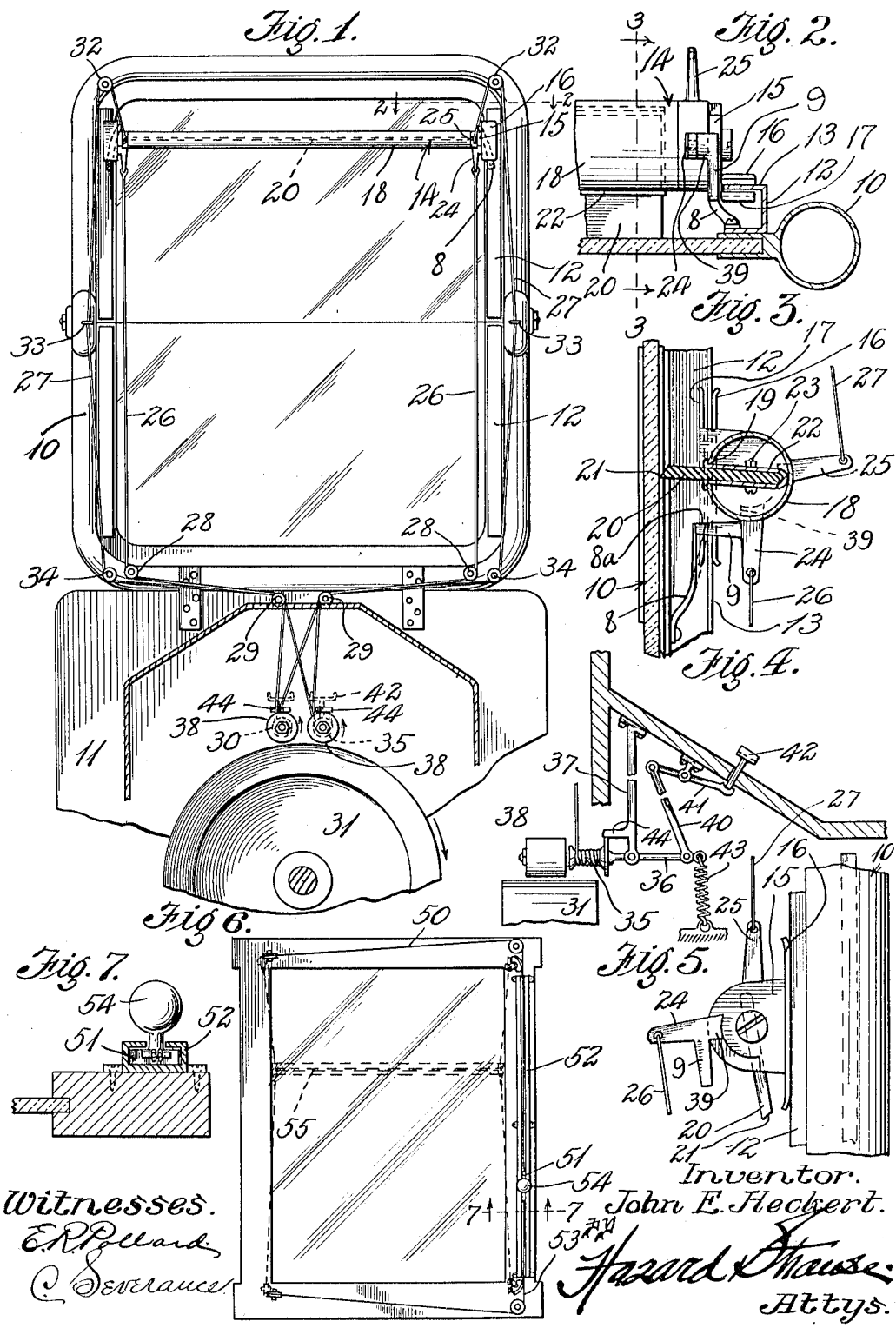

JOHN E. HECKERT, OF CLAREMONT, CALIFORNIA.

WINDOW-CLEANER.

1,022,134.　　　　　Specification of Letters Patent.　　Patented Apr. 2, 1912.

Application filed May 4, 1911.　Serial No. 624,941.

*To all whom it may concern:*

Be it known that I, JOHN E. HECKERT, a citizen of the United States, residing at Claremont, in the county of Los Angeles and State of California, have invented new and useful Improvements in Window-Cleaners, of which the following is a specification.

This invention relates to improvements in window cleaning mechanisms, and it is an object of the invention to provide a window cleaning device which can be applied to all kinds of windows, but is particularly adapted for use upon windows of vehicles or the wind shields of automobiles or other glazed surfaces.

It is also an object of the invention to provide a window cleaning mechanism having a cleaning device adapted to be moved over the surface of a window, the structure being such that the window engaging portion may be kept in engagement with the glass when moving in one direction and may be lifted out of engagement therewith when moving in the opposite direction.

It is a further object of the invention to provide such a device upon a vehicle so arranged and connected that the cleaning means may be operated by a moving part of the vehicle.

The mechanism is well adapted for use upon vehicles of various kinds, and for this reason the principal features of the invention have been illustrated in the accompanying drawing with the device applied to an automobile.

In the accompanying drawing forming a part of this specification; Figure 1 is a front elevation of a wind screen upon an automobile, the same being shown with the improved window cleaning mechanism applied thereto, and means for operating the same from a movable part of the vehicle. Fig. 2 is an enlarged detail sectional view taken horizontally through the edge of the window screen upon the line 2—2 of Fig. 1, the end of the cleaning device being shown in elevation. Fig. 3 is a detail sectional view upon the same scale taken upon the line 3—3 of Fig. 2. Fig. 4 is a detail sectional view through a portion of the vehicle mechanism, showing the means for operating the cleaning device in conjunction with an operating part of the vehicle driving mechanism. Fig. 5 is an enlarged fragmentary detail view looking at the edge of a portion of the wind screen, and at the end of the window engaging portion of the cleaner. Fig. 6 is a front elevation of a window, having a hand operated window cleaning mechanism applied thereto. Fig. 7 is a detail sectional view taken upon the line 7—7 of Fig. 6.

The features of the present invention will now be particularly described with reference to the drawing in which 10 indicates a wind screen mounted upon the dash-board 11 of an automobile. The wind screen may be of the single pane type or as shown in the drawing of the double pane or folding type. The said screen is provided with guide means for directing the cleaning apparatus, the said guide means preferably consisting of angle plates 12, having their outer flanges 13 turned inwardly to form guides for the glass engaging member of the cleaning device. Such guides are usually placed upon both edges of the screen, and when the screen is of the folding type, sectional guides or angle plates are applied to each section of the screen in alinement with each other as clearly shown in Fig. 1.

The glass engaging portion of the mechanism comprises a rocking member 14, which is pivotally mounted at its ends upon movable brackets 15. The said brackets have laterally extending guiding flanges 16 and 17 which engage the flanges 13 of the angle plates. The said brackets 15 are thus adapted to slide up and down upon the window or screen framing. The body part of the rocking member 14 is preferably formed of tubing 18, having a slot 19 extending longitudinally thereof in which is mounted the window cleaning means employed. The said means may consist of a rubber strip 20 having a sharp edging 21 adapted to engage a surface of the window glass. The inner end of the said strip 20 is carried by a U shaped strip 22 of metal which fits into the groove 19 and is readily fastened to the tube 18. Rivets or bolts 23 may be employed for securing the rubber strip in said U shaped strip 22.

In order to engage a suitable operating mechanism, the rocking member 14 is provided with projecting arms 24 and 25, preferably arranged at the ends thereof and adjacent to the brackets 15. The arms 24 have shouldered portions 39 formed thereon adapted to engage opposing shoulders and also to release spring catches, that hold the scraper in position at the top of the glass, formed upon the bracket 15 for limiting the movement of the said arms 24 and thereby of the rocking member 14 as indicated in Fig. 5. The arms 24 and 25 are usually provided at each end of the said rocking member 14 and the arms 24 are connected with cords or cables 26 capable of pulling the rocking member with the cleaning strips 20 downwardly in front of the window. The arms 25 preferably project at an angle with respect to the arms 24 and usually at approximately right angles thereto, and are connected with cords 27 by which the cleaner may be pulled upwardly again. It will be observed that the arms 24 and 25 are so arranged that when the cables 26 are pulled upon for drawing the cleaner downwardly, the rocking member will be turned so that the edge of the strip 20 bears against the adjacent glass or window pane and when the arms 25 are pulled upon the cords 27, the said arms will be caused to rock the member 14 and turn the strip 20 out of engagement with the glass. To hold the cleaner normally in its uppermost position, springs 8 are secured to the shield or window frame, the end of each of said springs 8 being arranged to engage the corner 8$^a$ of each of the brackets 15 as indicated in dotted lines in Fig. 3. The said springs will also serve to prevent the cleaner from being drawn downwardly until the rubber strip 20 is turned so that its sharp edge 21 engages the glass. In order to release the brackets 15 from the said springs 8, the arms 24 are provided with laterally projecting releasing arms 9. These arms are made of such a length that when the arms 24 are pulled downwardly to the position shown in Fig. 3, they will press the end of the springs 8 inwardly so as to release the shoulders 8$^a$ of the brackets 15 therefrom and permit the cleaner to be drawn downwardly.

The cords 26 extend downwardly and pass about guide pulleys 28 which are mounted near the lower edge of the screen or upon the same, and the said cables are then guided by pulleys 29 from which they pass to a winding drum 30 mounted adjacent to a movable part of the vehicle mechanism. As shown in Fig. 1 the drum 30 is mounted adjacent to the periphery of a fly wheel 31 connected with the motor of the automobile. The cords 27 extend upwardly and about pulleys 32 and thence downwardly through guide loops 33 mounted upon an intermediate portion of the wind screen from which the cords pass to the guide pulleys 34 at the bottom of said screen. The cords then pass over the pulleys 29 and to a winding drum 35.

To facilitate the actuation of the drums, each of them is mounted upon a shaft as 36 which is pivoted at the lower end of a hanger 37 secured to the framing of the automobile. The said shafts 36 project forward of the hangers 37 a sufficient distance to carry friction disks or rollers 38 which are journaled thereon and each of said rollers 38 is connected with the drum 30 or 35 upon their respective shafts. The friction roller 38 is so arranged as to be capable of bearing against the periphery of the fly wheel 31 and by depressing the ends of the shafts 36 and the rollers 38 thereon, the said rollers may be caused to wind up either one drum or the other, the said drums being usually operated alternately for drawing the window engaging means up and down.

The shafts 36 are each connected by links 40 with pivoted levers 41 secured to the framing of the automobile. The free ends of the levers 41 are engaged by treadles 42 mounted within easy reach of the foot of the automobile operator, the stems of said pedals projecting through the flooring of the automobile and engaging the said levers 41 as clearly shown in Figs. 4. The shafts 36 are normally held so as to engage the rollers 38 from the fly wheel 31, by means of springs 43 which are connected with the inner ends of said shafts, and which extend therefrom to an adjacent fixed part of the automobile structure.

It will be observed by reference to Fig. 1 that each of the drums is provided with a foot operating treadle so that by pressing upon one, the window cleaner may be drawn downwardly and by pressing upon the other, the window cleaner may be carried up again and so on alternately. The drums may also be provided with a braking mechanism, the said braking mechanism comprising projecting arms 44 carried by the hangers 37 and arranged in such proximity to the circular ends of the drums that when the springs 43 are permitted to lift the drums to their inactive positions they will be carried against the said arms 44. The relation of the shafts 36 to the arm 44 is such as to permit of this action as will be clearly understood by reference to Fig. 4 of the drawing.

It will be understood that the mechanism above described may be applied to the windows or glazed surfaces of any vehicle, and that by arranging the winding drums adjacent to the wheels or other moving parts thereof, the cleaner can be mechanically operated as above described. The cleaning device is also applicable to the windows of other structures, as for instance to the cab windows of locomotives or any of the windows of cars or of buildings. In the event that there is no convenient moving part for driving the mechanism described, the mechanism can be readily arranged for operation by hand. This is shown in Fig. 6. Lifting cables 50 may be extended to a slide 51 movably mounted in an elongated slotted casing 52 which forms a guide upon the side of the window frame. The depressed cables 53 are also connected with said slide 51. A projecting handle 54 makes it possible to grasp the same and move it up and down. Since it is usually desirable to be able to operate the cleaner upon the outside of the window especially upon moving vehicles, from the inside of said windows, the cables 50 and 53 usually extend through the window casing and about suitable pulleys as shown in Fig. 6 and thence to the cleaning member 55 on the outside of the glass.

It will be apparent from the above description that the mechanism can be readily adapted to various uses and can be operated automatically or by hand from the interior of a vehicle or structure for rubbing and cleaning the outside surface of the glass of a window.

What I claim is;

1. A window cleaning mechanism comprising a rocking bar, guiding means mounted upon a window, guiding means engaging the same and carried by the said rocking bar, a latch for holding the bar in elevated position and means for moving the bar back and forth upon the said guides, the said means also effecting the rocking of the bar, and means operated thereby for releasing said latch.

2. A window cleaning mechanism comprising a window cleaning member, cords for moving the same back and forth over a glazed surface, drums for moving the cords first in one direction and then in the other, and means connected with the drums for engaging a source of power for operating the window cleaning device.

3. A window cleaning mechanism, comprising a glass engaging member, cords connected therewith, pulleys directing the movement of said cords, winding drums for actuating the cords to move the member back and forth over the glass, friction rollers connected with said drums, and means for carrying the said rollers against the moving part of a vehicle mechanism whereby the drums will be wound and unwound for moving the window cleaning member.

4. A window cleaning mechanism, comprising a glass engaging member, cables for moving the same back and forth upon the glass, drums adapted to wind up said cables, rock shafts carrying the drums, friction rollers for turning the drums, the said rollers being arranged in the proper relation to the fly wheel of a vehicle motor, and treadles capable of pressing the said friction rollers against the said fly wheel for imparting movement to the drums.

5. A window cleaning device, comprising a movable window engaging member, cords for drawing the same back and forth over a glazed surface, said cords extending over suitable guiding means for directing their action, a plurality of winding drums engaging said cords, means for communicating power to the drums for winding or unwinding the cords, rock shafts carrying said drums, treadles connected with each rock shaft for rocking them and braking means arranged adjacent to said drums and adapted to check their movement when desired.

6. A window cleaning mechanism for automobile wind shields or other glazed surfaces, comprising a glass engaging rocking member, means for guiding the same on the wind shield, cables connected with the rocking member and adapted to pull the same back and forth over the glazed surface, and also to rock the same into and out of engagement with said glazed surface, pulleys adapted to wind and unwind the said cables for actuating the rocking member, friction rollers connected with the pulleys and arranged adjacent to the periphery of the automobile fly wheel, pivotally mounted shafts carrying said drums and pulleys, and springs normally holding the drums out of engagement with the said fly wheel, levers connected with the said shafts for forcing the drums into engagement with the fly wheel, and treadles arranged in convenient position for actuating the said pivoted shafts.

7. A window cleaning mechanism comprising a rocking window engaging member, means for detaining the said rocking member in its uppermost position, and means for rocking the said member, the said latter means carrying means for disengaging the detaining means from the said rocking member.

8. A window cleaning mechanism, comprising a rocking member having a glass engaging scraper, arms secured to the rocking member for turning the scraper into and out of engagement with the window, the rocking member having spring engaging shoulders carried thereby, retaining springs mounted upon the window and adapted to engage said shoulders for holding the rocking member in its elevated position, a projection carried by some of said arms and adapted to depress said springs and disengage the shoulders of the rocking member therefrom, and means for pulling upon the arms carrying said projections for drawing the rocking member downwardly.

In witness that I claim the foregoing I have hereunto subscribed my name this 27th day of April, 1911.

JOHN E. HECKERT.

Witnesses:
IRA F. WIRE,
CLEMET R. MAY.